(12) United States Patent
Mudi et al.

(10) Patent No.: US 11,443,241 B2
(45) Date of Patent: Sep. 13, 2022

(54) METHOD AND SYSTEM FOR AUTOMATING REPETITIVE TASK ON USER INTERFACE

(71) Applicant: Wipro Limited, Bangalore (IN)

(72) Inventors: Sourav Mudi, Burdwan (IN); Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 360 days.

(21) Appl. No.: 16/835,038

(22) Filed: Mar. 30, 2020

(65) Prior Publication Data

US 2021/0304064 A1 Sep. 30, 2021

(30) Foreign Application Priority Data

Mar. 26, 2020 (IN) .............................. 202041013276

(51) Int. Cl.
  *G06N 20/00* (2019.01)
  *G06F 8/41* (2018.01)
  *G06F 9/451* (2018.01)
  *G06N 3/00* (2006.01)

(52) U.S. Cl.
  CPC .............. *G06N 20/00* (2019.01); *G06F 8/427* (2013.01); *G06F 9/451* (2018.02); *G06N 3/008* (2013.01)

(58) Field of Classification Search
  None
  See application file for complete search history.

(56) References Cited

U.S. PATENT DOCUMENTS

| | | |
|---|---|---|
| 8,976,955 B2 | 3/2015 | Liberman Ben-Ami et al. |
| 2012/0239598 A1* | 9/2012 | Cascaval ................ G06N 20/00 706/12 |
| 2016/0092591 A1* | 3/2016 | Barouni Ebrahimi .. G06F 16/93 707/709 |
| 2017/0019489 A1* | 1/2017 | Churchill ........... G06Q 30/0201 |
| 2017/0168996 A1 | 6/2017 | Dou et al. |
| 2021/0158268 A1* | 5/2021 | Berg ................... G06F 16/2465 |

FOREIGN PATENT DOCUMENTS

| | | |
|---|---|---|
| CN | 107678952 A | 2/2018 |
| EP | 3215900 B1 | 11/2019 |

\* cited by examiner

*Primary Examiner* — Howard Cortes
(74) *Attorney, Agent, or Firm* — Finnegan, Henderson, Farabow, Garrett & Dunner, LLP

(57) ABSTRACT

A method and system for automating repetitive task on a user interface is disclosed. The method includes identifying a plurality of Document Object Model (DOM) elements from a repetitive pattern. The method further includes identifying a set of dynamic DOM elements from the plurality of DOM elements. The method further includes determining a path and a path position within the application code of the repetitive pattern for each of the set of dynamic DOM elements. The method further includes training an Artificial Intelligence (AI) model to identify the repetitive pattern and to identify the corresponding path and the path position within the application code component, for each of the set of dynamic DOM elements. The method further includes automatically executing a code for each of the set of dynamic DOM elements based on the associated path and path position.

21 Claims, 7 Drawing Sheets

METHOD AND SYSTEM FOR AUTOMATING REPETITIVE TASK ON USER INTERFACE

TECHNICAL FIELD

This disclosure relates generally to process automation, and more specifically to method and system for automating repetitive task on user interface.

BACKGROUND

Manually performing a set of actions for a repetitive task on user interface of any device to achieve a desired result may be time consuming for a user. For example, for each query request, the user may need to manually interact with the computer to click a button in order to open a window for composing a new response and for sending the response message. Many conventional mechanisms exist for automating this manual process largely, which reduce the overall time consumption. One of the common conventional mechanisms used for automating daily routine processes is a Robotic Process Automation (RPA). In RPA, RPA bots are developed for automating and enhancing the manual work performed by the user with faster pace, reduced time, and without the need of human intervention.

However, a major drawback with the RPA mechanism is the development of these RPA bots with accurate precision and accuracy. The user may not be able to develop best functional system due to certain restrictions that cannot be mitigated by the conventional mechanisms. These restrictions that do not allow the user to develop best functional systems includes architecture of RPA bots that limits the scope for automating any application, placement of RPA bots, and dependency on third party tool. Additionally, no proper technical package or standards are available for developing RPA. Hence, these conventional mechanisms are very discrete and hard to implement. In addition, none of the conventionally available mechanism is capable of determining different elements along with their state from different webpages for developing RPA bots in order to optimize repetitive tasks. Moreover, none of the conventional mechanism provides a technique for feeding a dataset using AI powered scrapping system, which may help in generating effective web crawlers for clicking the elements. There is therefore a need for a robust and effective mechanism for determining the elements and their states for automating the repetitive task without the limitations of conventional mechanisms.

SUMMARY

In an embodiment, a method for automating repetitive task on a user interface is disclosed. In one embodiment, the method may include identifying a plurality of Document Object Model (DOM) elements from a repetitive pattern. The plurality of DOM elements are identified based on parsing of an application code component of the repetitive pattern. The method may further include identifying a set of dynamic DOM elements from the plurality of DOM elements. The frequency of change of state of each of the set of dynamic DOM elements is above a first predefined threshold, and execution of the set of dynamic DOM elements is based on a sequence within the repetitive pattern. The method may further include determining a path and a path position within the application code component of the repetitive pattern for each of the set of dynamic DOM elements. The method may further include training an Artificial Intelligence (AI) model to identify the repetitive pattern and to identify, for each of the set of dynamic DOM elements, the corresponding path and the path position within the application code component. The method may further include automatically executing a code for each of the set of dynamic DOM elements based on the associated path and path position. The code for each of the set of dynamic DOM elements are executed in conformance with the sequence within the repetitive pattern.

In another embodiment, a system for automating repetitive task on a user interface is disclosed. The system includes a processor and a memory communicatively coupled to the processor, wherein the memory stores processor instructions, which, on execution, causes the processor to identify a plurality of Document Object Model (DOM) elements from a repetitive pattern. The plurality of DOM elements are identified based on parsing of an application code component of the repetitive pattern. The processor instructions further cause the processor to identify a set of dynamic DOM elements from the plurality of DOM elements. The frequency of change of state of each of the set of dynamic DOM elements is above a first predefined threshold, and execution of the set of dynamic DOM elements is based on a sequence within the repetitive pattern. The processor instructions further cause the processor to determine a path and a path position within the application code component of the repetitive pattern for each of the set of dynamic DOM elements. The processor instructions further cause the processor to train an Artificial Intelligence (AI) model to identify the repetitive pattern and to identify, for each of the set of dynamic DOM elements, the corresponding path and the path position within the application code component. The processor instructions further cause the processor to automatically execute a code for each of the set of dynamic DOM elements based on the associated path and path position. The code for each of the set of dynamic DOM elements are executed in conformance with the sequence within the repetitive pattern.

In yet another embodiment, a non-transitory computer-readable storage medium is disclosed. The non-transitory computer-readable storage medium has instructions stored thereon, a set of computer-executable instructions causing a computer that includes one or more processors to perform steps that include identifying a plurality of Document Object Model (DOM) elements from a repetitive pattern, wherein the plurality of DOM elements are identified based on parsing of an application code component of the repetitive pattern; identifying a set of dynamic DOM elements from the plurality of DOM elements, wherein frequency of change of state of each of the set of dynamic DOM elements is above a first predefined threshold, and wherein execution of the set of dynamic DOM elements is based on a sequence within the repetitive pattern; determining a path and a path position within the application code component of the repetitive pattern for each of the set of dynamic DOM elements; training an Artificial Intelligence (AI) model to identify the repetitive pattern and to identify, for each of the set of dynamic DOM elements, the corresponding path and the path position within the application code component; automatically executing a code for each of the set of dynamic DOM elements based on the associated path and path position, wherein the code for each of the set of dynamic DOM elements are executed in conformance with the sequence within the repetitive pattern.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
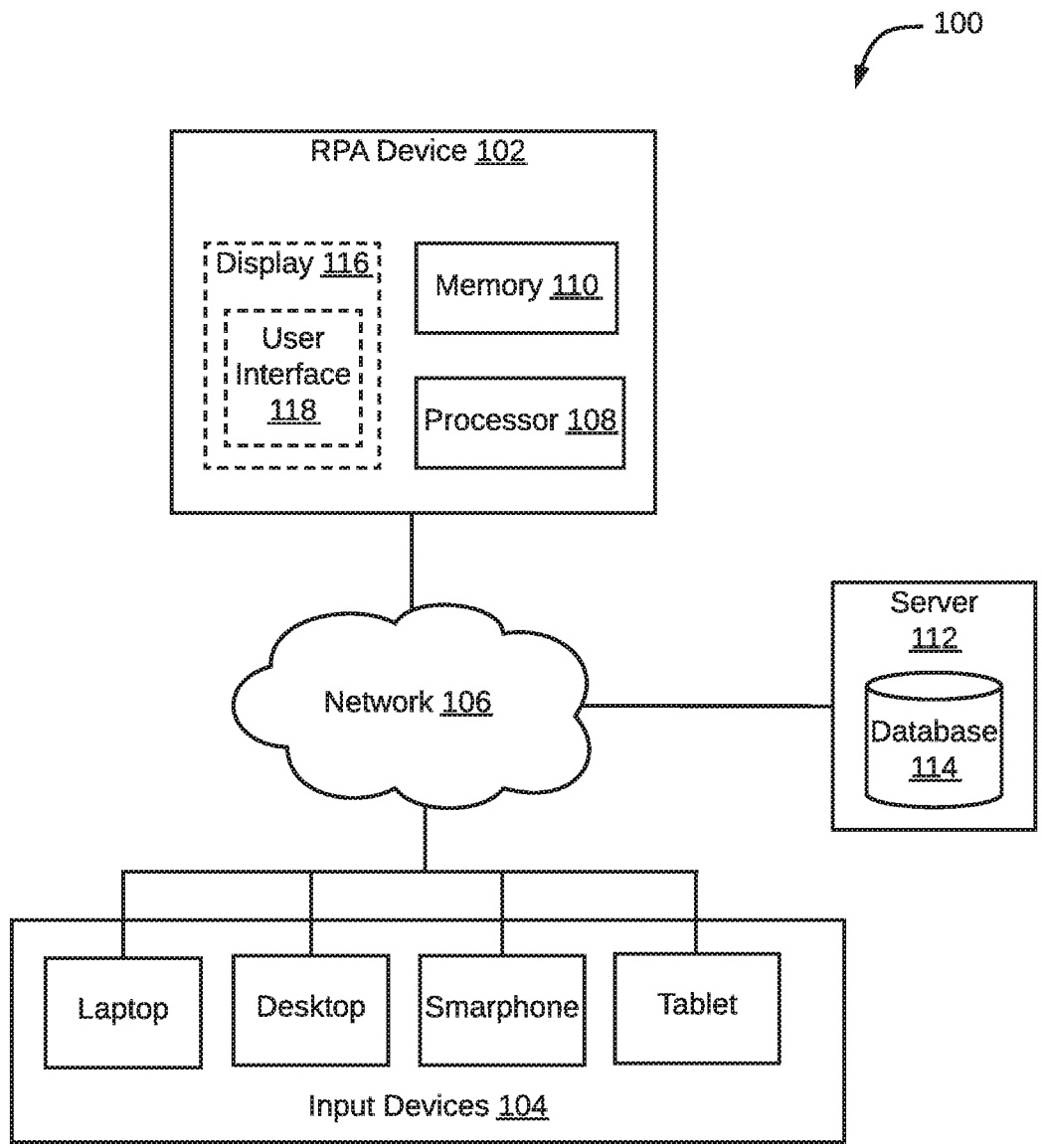
FIG. 1 represents a block diagram of a system for automating repetitive task on a user interface, in accordance with an embodiment.

In one embodiment, a system 100 for automating repetitive task on a user interface is illustrated in FIG. 1. The system 100 may include a Robotic Process Automation (RPA) device 102, The RPA device 102 may have the processing capabilities to automate repetitive tasks in order to eliminate manual repetitive efforts of a user, performed for a similar set of actions. It should be noted that, the repetitive tasks may also be referred to as a repetitive patterns. The repetitive tasks may include, but are not limited to web site scraping, customer order processing, incoming customer e-mail query processing, transferring data from one system to another, call center operations, payroll processing, and forms processing. Examples of the RPA device 102 may include, but are not limited to, a server, a desktop, a laptop, a notebook, a netbook, a tablet, a smartphone, and a mobile phone.

The RPA device 102 may receive each of the repetitive pattern from input devices 104. Examples of the input devices 104 may include, but are not limited to a laptop, a desktop, a smartphone, and a tablet. The input devices 104 are communicatively coupled to the RPA device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). Once the repetitive pattern is received, the RPA device 102 may extract a plurality of Document Object Model (DOM) elements from the repetitive pattern. In an embodiment, the plurality of DOM elements may be identified based on parsing of an application code component of the repetitive pattern. Moreover, the application code component of the repetitive pattern may be extracted from a server 106 via the network 106. The server 106 may include a database 108 that may be updated periodically with a new application code component for a new repetitive pattern that may need automation.

As will be described in greater detail in conjunction with FIG. 2 to FIG. 7 in order to automate the repetitive task on the user interface, the RPA device 102 may include a processor 108 which may be communicatively coupled to a memory 110. The memory 110 may store processor instructions, which when executed by the processor 108 may cause the processor 108 to automate the repetitive task. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The RPA device 102 may include a display 116 that may further include a user interface 118. A user or an administrator may interact with the RPA device 102 and vice versa through the display 116. The display 116 may be used to display an intermediate result or a final result for the automation of the repetitive task, as performed by the RPA device 102. The user interface 118 may be used by the user to provide inputs on the intermediate results (for misidentification of a pattern category associated with the repetitive task) to the RPA device 102.

Figure 2:
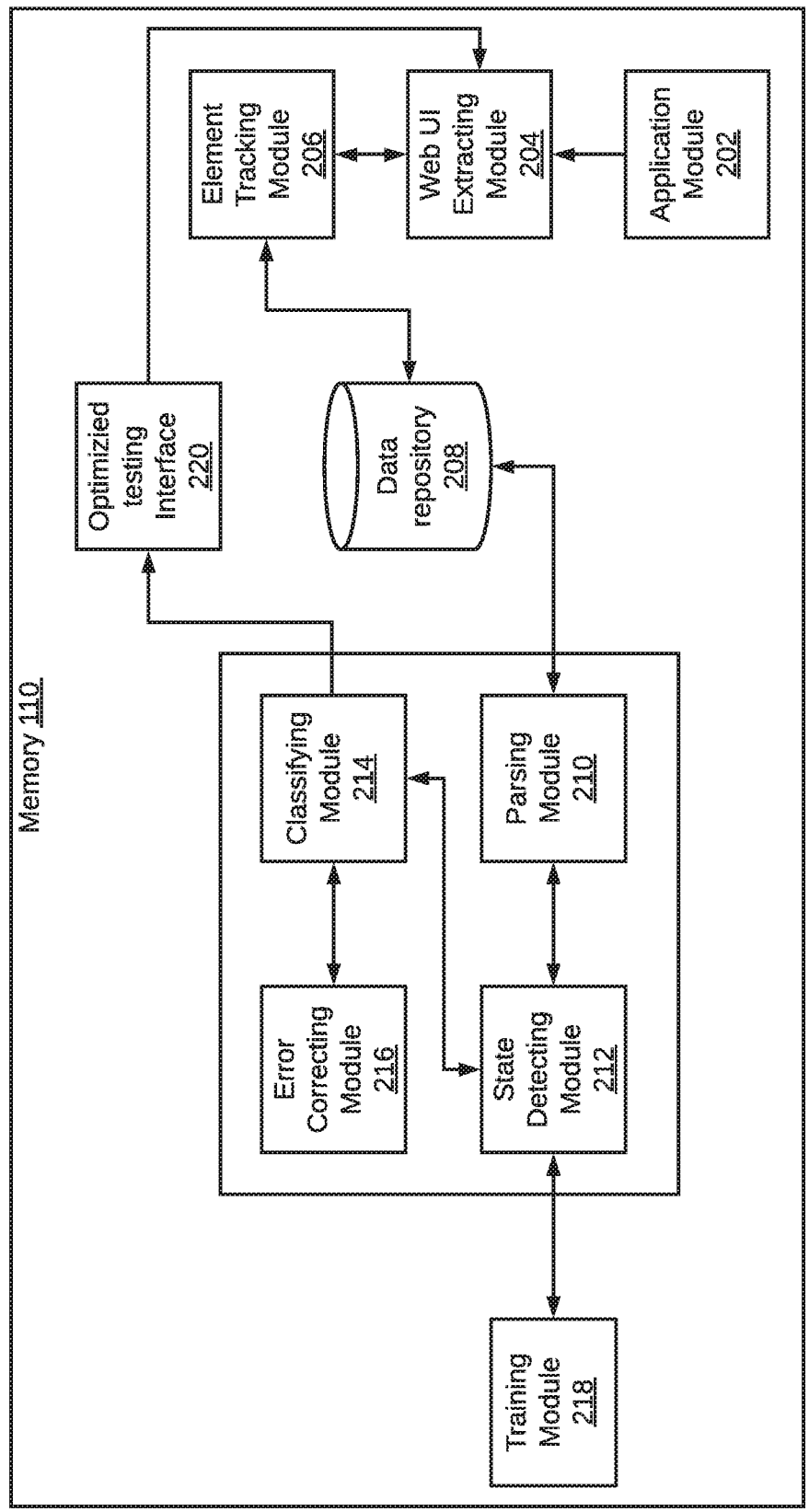
FIG. 2 illustrates a functional block diagram of various modules within a memory of a Robotic Process Automation (RPA) device to automate repetitive task on a user interface, in accordance with some embodiment.

Referring now to FIG. 2, a functional block diagram of various modules within the memory 110 of the RPA device 102 configured to automate a repetitive task on a user interface is illustrated, in accordance with some embodiment. As explained in conjunction with FIG. 1, the RPA device 102 may automate the repetitive task by detecting a plurality of DOM elements. The memory 110 may include modules that may perform various functions so as to automate the repetitive task. The memory 110 may include an application module 202, a web user interface (UI) extracting module 204, an element-tracking module 206, a data repository 208, a parsing module 210, a state detecting module 212, a classifying module 214, an error correcting module 216, a training module 218, and an optimized testing interface 220. As will be appreciated by those skilled in the art, all such aforementioned modules 202-220 may be represented as a single module or a combination of different modules. Moreover, as will be appreciated by those skilled in the art, each of the modules 202-220 may reside, in whole or in parts, on one device or multiple devices in communication with each other.

In an embodiment, the application module 202 may connect multiple domains at a single interface irrespective of domain associated with a particular application. In an embodiment, the application may correspond to a browser application. The browser application may be connected at back to a search engine to filter a query. The browser application may filter the query in order to obtain an optimized outcome from a result of the query. Moreover, the browser application may include an associated web-driver, in order to obtain domain-hosted details from the browser application. The application module 202 may then send the domain-hosted details to the web UI extracting module 204. It should be noted that, the associated web-driver may vary based on vendors of the browser application. By way of an example, a Firefox browser application, a Bing browser application, and an Internet Explorer browser application, may include a different setup of the associated web-drivers. The associated web drivers may be used to extract the application code component. By way of an example, the application code component may be defined as a self-contained unit of functionality. In an embodiment, the application code component may correspond to a piece of code that may represent a particular functionality. Thereafter, the application code components extracted may be further used for testing purpose. In order to extract the application code component, the associated web-drivers of the browser application may take a domain address or an Internet Protocol (IP) address as an input. Based on the input, the associated web-drivers may send the application code component corresponding to the domain address as an output to the web UI extracting module 204.

The web UI extracting module 204, may receive webpage details and the application code component from the application module 202. The webpage details may include the domain-hosted details. The web UI extracting module 204 may store the application code component that may be detected for automation and may be required to be optimized by an end-user or system. In an embodiment, the application code component may also be referred to as a web User Interface (UI) code. In addition, the web UI extracting module 204 may determine the plurality of Document Object Model (DOM) elements that may be used by the end user while using the browser application. Examples of the plurality of DOM elements may include, but are not limited to an HTML element ID, an element class and an element label. Example of two application code component with two different DOM elements that is for the element ID and the element class are represent via equation (1) and (2) respectively:

Element—ID Example:

<div id='35345'>

<p> this is element id</p>

</div>   (1)

Element Class Example:

<div class="nav-bar">

<ul>Select table

<li>Apple</li>

<li>orange</li>   (2)

As will be appreciated, a highlighted part of equation (1), i.e., (id='35345') and (2), i.e., (class="nav-bar"), represents two different types of DOM elements that may be extracted from the application code component. In other words, equation (1) and (2) represents two different types of DOM elements extracted that may be used for developing RPA bots. Thereafter, the plurality of DOM elements may be activated, and a message may be passed to the element tracking module 206 for fetching the plurality of DOM elements. The element tracking module 206 may fetch the plurality of DOM elements by parsing the application code component for the repetitive pattern. Moreover, detection and tracking of the plurality of DOM elements between the browser application and the application code component may be performed based on auto-inspection of the plurality of DOM elements. The web UI extracting module 204 may activate the element tracking module 206 by sending the webpage details and the application code component.

Thereafter, the element tracking module 206 may determine the plurality of DOM elements. Additionally, the web UI extracting module 204 may receive the plurality of DOM elements from the optimized testing interface 220 for learning purpose. The web UI extracting module 204 may communicate to the element tracking module 206 via several network protocols used on Internet, including Transmission Control Protocol/Internet Protocol (TCP/IP), User Datagram Protocol (UDP), Simple Network Management Protocol (SNMP), Internet Control Message Protocol (ICMP), Secure Socket Layer (SSL) and Hypertext Transfer Protocol (HTTP).

The element tracking module 206 may be configured to receive the web page details and the application code component from the web UI extracting module 204. Moreover, the element tracking module 206 may be configured to trace each of the plurality of DOM elements from a section of the application code component. The element tracking module 206, may trace each of the plurality of DOM elements by inspecting activated state of each of the plurality of DOM elements. In addition, the element tracking module 206, may be configured to consume an active session from the web UI module 204, that may be subjected to more complexity. The active sessions may be determined from the activated state of each of the plurality of DOM elements. It should be noted that, many a times due to different script and operations, the plurality of DOM elements may remain active that may be needed to be avoided by the element tracking module 206, in order to reduce capturing of a false positive sessions. In an embodiment, the element tracking module 206 may reduce the complexity caused due to consumption of the active sessions by implementing a thread for each of the active session. Further, the thread implemented may implement a counter for each of the active session. The counter implemented may not increase, when the active session may operate in its own cycle. However, the counter may increase, when the active session may pass from one active session to another active session, thereby mitigating the thread to that active session. This in turn may remove the false positive sessions from the active sessions.

Moreover, the element tracking module 206 may act as an extension for tracking respective element from the application code component. In order to track the respective element, the element tracking module 206 may match the respective element with the associated application code component. When the element and the associated code component is matched then, a token may be generated correspond to the application code component. Thereafter, the element tracking module 206 may send the respective token to the parsing module 210 in order to parse the element from the associated code component. Moreover, when the element does not match with the associated code component, then the application code component may be checked. However, sometimes due to dynamic state of the element, the element may not match exactly but rest part of the application code component may match. This may help to track location of the element in the application code component. The tracked location of the element may be remembered by implementing a pointer. Moreover, the element tracking module 206 may be configured to send the plurality of DOM elements traced, which may be derived from the application component for storage to the data repository 208.

The data repository 208 may be configured to receive the plurality of DOM elements traced that may be derived from the application code component from the element tracking module 206. In an embodiment, the data repository 208 may act as a temporary storage unit. The data repository 208 may store a dataset and may be responsible to perform all sorts of parsing and extraction operations. Moreover, the data repository 208 may perform state detection and classification by initializing temporary memory. The data repository 208 may operate on instances. By way of an example, there might be certain cases where multiple web-drivers may be needed to be operated at a same instance. In such cases, the data repository 208 may include temporary memory that may be divide based on instances of the web-drivers along with the domain with which the web-drivers may be connected. Moreover, a new memory in the data repository 208 may be allocated for every new web driver instanced along with a new domain. However, the web-drivers that may connect to a similar domain even with different functionalities may be kept in same instance of the temporary memory. This may help in increasing performance by reducing repetitive task of initialization of defining the application code components as the initialization for the repetitive task may be already available.

The parsing module 210 may receive the application code component of the repetitive pattern and the plurality of DOM elements traced by using an application driver/the web-drivers from the data repository 208. Once the application code component may be received, the parsing module 210 may remove a code from the dataset so as to fetch an output code. The output code may be extracted by determining a source for each of the plurality of DOM elements. It should be noted that, the source for each of the plurality of DOM elements may be defined in a cloud environment by the web-drivers and the active sessions. Moreover, the web-drivers share the source of the plurality of DOM elements, when computation for each of the plurality of DOM elements may be performed locally.

However, since different browser applications may have different mechanisms for initializing the application code component, hence, the parsing module 210 may determine change in each of the different mechanism based on a category of the browser application. By way of an example, in case of the chrome application, the web-drivers of the chrome application may use different forms of initialization of the application code component. Similarly, for the fire-fox application, the web-drivers of the fire-fox application may use different forms of initialization of the application code component. It should be noted that, initialization of the application code component may vary from one browser application to another. Additionally, another parameter that must be considered for having different mechanisms for initializing the application code component may be related to hosting tokens. Another parameter considered related to the hosting tokens may be due a personalized hosting server i.e., there may be different mechanisms for initializing the application code component. As will be appreciated, in order to avoid different mechanisms that may be used for initializing of the application code component for different browsers, the end user may need to install web-drivers while using the parsing module 210, Further, the parsing module 210 may use the web-drivers to determine the hosting tokens for the corresponding browser application. By way of an example, based on the web-drivers used to determine the hosting tokens, the parsing module 210, may extract the output code based on a pre-defined rule of Hypertext Markup Language (HTML) and eXtensible Markup Language (XML). It should be noted that, the pre-defined of HTML and XML may be used to dissolve the application code component from the data repository 208.

Additionally, the parsing module 210, may parse the application code component of the repetitive pattern to identify the plurality of DOM elements. In should be noted that, the parsing technique may be operated using any kind of server client architecture where connection may be established via network protocol such as TCP/IP, UDP, SNMP, ICMP, SSL and HTTP. Thereafter, the parsing module 210 may send the plurality of DOM elements to the state detection module 212 for storing. It should be noted that, the connection between the parsing module 210 and the state detection module 212 may be established by employing connection protocols using standard data connections means such as wireless or wired connections. Examples of the connection protocol may include, but is not limited to Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, SPI, Microwire, 1-Wire, IEEE 1284, Intel Quick Path Interconnect, InfiniBand, and PCIe.

The state detection module 212 may be configured to receive the plurality of DOM elements parsed from the parsing module 210. The state detection module 212 may also be configured to determine a frequency of change in state of each of the plurality of DOM elements. It should be noted that, the change in state of each of the plurality of DOM elements may be either static state or dynamic state. In an embodiment, a set of static DOM elements from the plurality of DOM elements may be identified directly when the change in state may be static state for each element in the set of static DOM elements. In another embodiment, a set of dynamic DOM elements from the plurality of DOM elements may be identified based on a path when the change in the state may be dynamic state for each element in the set of dynamic DOM elements. Moreover, the static state for the set of static DOM elements may be determined by the parsing module 210 based on a same data types, a same class types, and other similar parameters. Additionally, based on the same data types, a change in data types may be determined for each element in the set of dynamic DOM elements.

In addition, the state detection module 212 may also be configured to generate a pointer corresponding to the application code component (also referred to as thread) for each element in the set of dynamic DOM elements. The pointer corresponding to the application code component may be generated in order to navigate the pointer corresponding to each of the application code component. By way of an example, the pointer may be generated for each such thread, in order to navigate the pointer corresponding to each such thread. Moreover, the state detection module 212 may also be configured to determine the path corresponding to each element in the set of dynamic elements.

Thereafter, the state detection module 212 may be configured to send the frequency of change in state determined for each element in the set of dynamic DOM elements along with the set of dynamic DOM elements to the classifying module 214 for training purpose. It should be noted that, the connection between the state detection module 212 and the classifying module 214 may be established by employing connection protocols via standard data connection means such as wireless or wired connections. Examples of the connection protocol may include, but is not limited to Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, SPI. Microwire, 1-Wire, IEEE 1284, Intel Quick Path Interconnect, InfiniBand, and PCIe.

The classifying module 214 may be configured to receive the frequency of change in state determined for each element in the set of dynamic DOM elements along with the set of dynamic DOM elements and the associated application code component. Further, the classifying module 214 may be configured to learn rules for classifying each element in the set of dynamic DOM elements into multiple rules. The rules for the particular set of dynamic DOM elements may be determined that may be used for execution post learning the element. The rules may also be defined as an action, that defined by the end user or may be by optimized testing interface developers. The rules learned may also be referred as a plurality of repetitive pattern categories. By way of an example, each element in the set of dynamic DOM elements may be classified into the plurality of repetitive pattern categories based on prediction of similarity between two or more elements. Moreover, the similarity between the two or more elements may be determined based on a similarity threshold. In an embodiment, there may be multiple rules for the same application code component. In another embodiment, there may be multiple rules for the different application code component.

Additionally, the classifying module 214 may also be configured to determine a correct rule corresponding to each element in the set of dynamic DOM elements. The correct rule corresponding to each element may be determined based on selection of element and a corresponding sequence learnt. Further, the classifying module 214 may be configured to generate an output sequence for each element in the set of dynamic DOM elements based on an input sequence. It should be noted that, for 90% of infrastructure automation, the user interface and each element of the set of dynamic DOM elements may be same as previous one. Moreover, when the user interface for the element in the set of dynamic DOM elements is same, than overall output prediction becomes easy. This in turn may help to classify the element with 100% accuracy.

When the user interface corresponding to each element is different, but functionality is similar then, an error rate may exist. Moreover, when the error rate exists, an accuracy for classifying the elements may range from 86%-90%, for example. The changes in the user interface may happen when a display unit may change, or a dimension of the display unit may change. Hence, in order to fulfill the changes, the classifying module 214 may also learn post few occurrences of the sequence. Based on occurrences learnt, the classification module 214 may understand that the change in the display unit or the dimension has changed the element. Thereafter, the classifying module 214 may be configured to send a predicted misidentification to the error correcting module 216 in order to compare with desired output.

The error correcting module 216 may be configured to receive the predicted misidentification from the classification module 214. The predicted misidentification may be used by the error correcting module 216 to identify error. Further, the error correcting module 216 may be configured to manage span of error by reducing gap between errors based on a predicted sequence and an actual sequence for each element of the set of dynamic DOM element. As will be appreciated, the gap between errors may be reduced largely using backpropagation mechanism. The error-correcting unit may also be configured to proceed with the identified error based on the element mapped from the set of dynamic DOM element. In an embodiment, the backpropagation mechanism may reduce the errors based on backtracking a token corresponding to the element. The correction of error may also include some of real time forward tracking as well as back tracking.

Moreover, some model errors (also referred as formulation error) may also exists, that may be resolved based on user input. It should be noted that, the formulation errors are based on model used in machine learning or deep learning technique. Example of the model that may be used in proposed mechanism may be Long Short-Term Memory (LSTM) model. The LSTM model may have vanishing gradient problem as a bug. Therefore, in order to improve and update the LSTM model, a dataset that includes the set of dynamic DOM elements and the associated application code may be correctly trained by the training module 218, The training module 218 may be developed based on knowledge of determining the different formulation errors in the LSTM model. The formulation errors may be coded based on usability criteria.

Further, the training module 218 may be subjected to a change, in order to understand the formulation error in machine-learning unit of the training module 218. Moreover, the formulation error of other supervised learning may be different. Therefore, a user may need to make suitable changes in the training module 218 based on incoming formulation error. Thereafter, the error correcting module 216 may send back an output corresponding to the error corrected to the classification module 214. In addition, connection between the error correction module 216 and the training module 218 may undergo through direct bus communication. The connection between the error correction module 216 and the training module 218 may also be established via direct bus communication or via network protocols. The network protocols may include, but are not limited to TCP/IP, UDP, SNMP, ICMP, SSL and HTTP The training module 218 may be configured to receive the set of dynamic DOM elements along with the frequency of change in state for training from the state detection module 212 as an input. The training module 218 may use the LSTM model for learning the set of dynamic DOM elements along with the associated frequency of change of state. The LSTM model may also receive historic data. Further, based on historic data and the frequency of change in state, the LSTM model may learn the sequence pattern of each element in the set of dynamic DOM elements. Moreover, training done by the training module 218 may include different data types as well as different sources and sequence of data. In an embodiment, different data types may correspond to the plurality of repetitive patterns and the data may correspond to the set of dynamic DOM elements. Therefore, the training module 218 may be configured to manage and arrange different data types as well as different sources and sequence of data accordingly. The training of the data is based on past historic sequence collection of the data. The training module may also be configured to segregate the data based on source and difference in the sequence of training data. Further, the classifying module 214 may determine difference based on the sequence learned and trained by the LSTM model.

The optimized testing interface 220 interface may be designed to optimize repetitive task of humans with a standard process and use-case designed by the developers. The optimized testing interface 220 may be used to optimize multiple test cases. The test cases may be used by tester to avoid manual testing. The test cases may include the plurality of repetitive tasks. The optimized testing interface 220 may provide the plurality of DOM elements to the web UI extracting module 204. The plurality of DOM elements may be defined in use case of the optimized testing interface 220. The plurality of DOM elements may be traced, parsed, state detected, and trained. In addition, the plurality of DOM elements may be provided with a trigger, Thereafter, based on the trigger, the optimized testing interface 220 may determine next set of actions as well as next set of elements that may need to be used. It should be noted that, based on above technique of providing the trigger to determine next set of set of actions and elements, the optimized testing interface 220 may enable automatic learning of the use case for testing or developing automated software. The above technique may provide the plurality of DOM elements as an input to the optimized testing interface 220 in order to obtain an output. The output includes the next set of actions as the trigger for the next set of elements it has to operate based upon the next set of actions.

By way of an example, consider a use case to develop a software that may automate a login page, that may be performed without any manual intervention. In such use case, the automated software may provide the domain address and the web-driver details. In addition, sometimes the optimized testing interface 220 may provide details about a plurality of DOM elements associated with the use case. The web UI extracting module 204 may receive the use case as an input and may proceed with the extraction of a plurality of DOM elements. Further, the plurality of DOM elements may be followed by parsing, state detection, training, error correction, and with classification based upon the rules. Thereafter, the plurality of DOM elements may act as the trigger that may be used by the optimized testing interface 220. However, for some use case, the classifying module 214 may be directly called for executing the set of action associated to the webpage (example, the login page) provided, when the rules are already stored.

Figure 3:
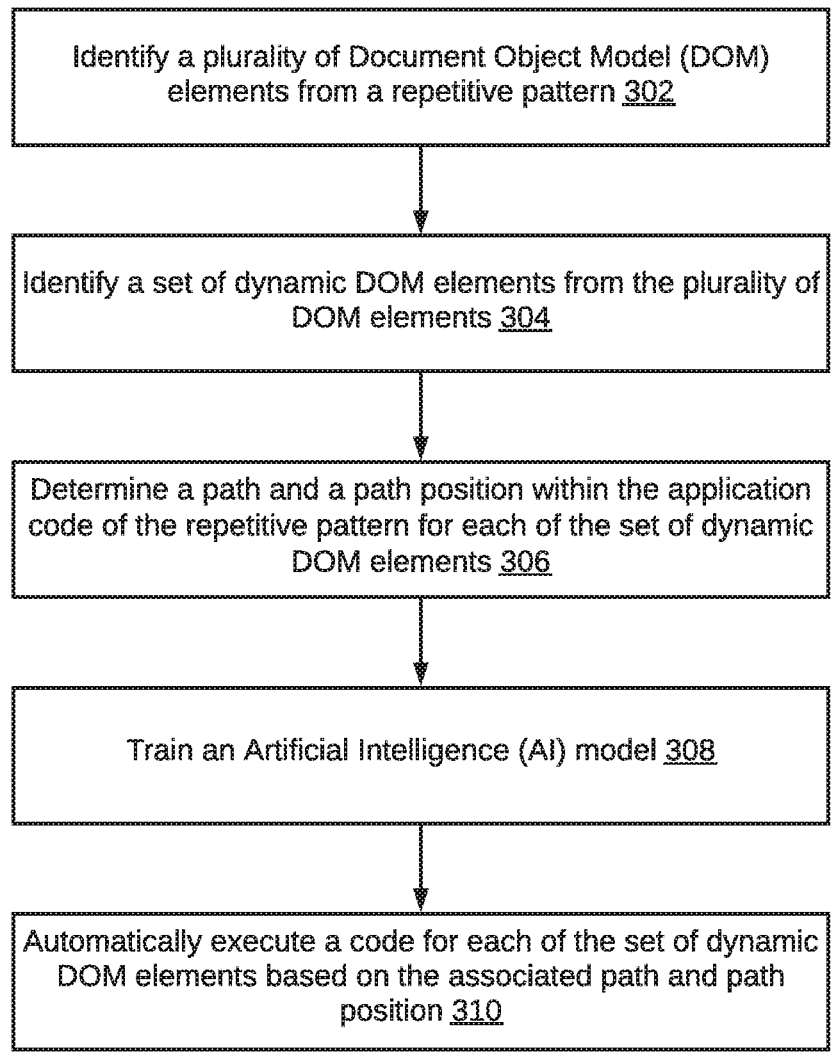
FIG. 3 illustrates a flowchart of a method for automating repetitive task on a user interface, in accordance with an embodiment.

Referring now to FIG. 3, a flowchart of a method for automating repetitive task on a user interface is illustrated, in accordance with an embodiment. At step 302, the plurality of DOM elements may be identified from the repetitive pattern. The plurality of DOM elements may be identified based on parsing of the application code component of the repetitive pattern. In order to identify the plurality of DOM elements, a dataset that includes the webpage details of the repetitive patterns along with the application code component may be received. It should be noted that the application code component may be a code in any language. Once the dataset is received, the plurality of DOM elements may be traced from the application code component by parsing.

In an embodiment, the application code component may be determined with the HTML and the XML based language. In similar embodiments, the plurality of DOM elements may be determined based on the datatype of each of the plurality of DOM elements. Example of the datatypes for the element may include, but is not limited to, class id, name, tag name, CSS selector, xpath, link text, and partial link text. Moreover, a declaration with these datatypes for the elements may be extracted and stored as dummy variables in the data repository 208. Thereafter, based on the datatypes for the elements stored, the application code component may be parsed to drive the plurality of DOM elements. The plurality of DOM elements may be generated based on a sequence token. The sequence may include combination of the derived element starting from object tracking until the end of the element. However, sometimes a change may exist within the sequence, and that may be traced based on occurrence of the sequence. Moreover, the dataset may be reformed to form another sequence before performing training, based on a predefined threshold point for the occurrence of the sequence. Based on reformation of the dataset, diversified element within same sequence may be traced thereby enhancing the automation technique. In addition, post creating the sequence a heap may be created that may be followed for training and executing each of the plurality of DOM element in the same heap.

With reference to FIG. 2, the element tracking module 206 may receive the dataset from the web DI extraction module 204. Thereafter, the frequency of change in state may be determined for each of the plurality of DOM elements. In conjunction to FIG. 2, the frequency of change in state may be tracked by the element tracking module 206. It should be noted that, the frequency of change in state corresponding to each element in the plurality of DOM elements may be either one of the static state or the dynamic state. Thereafter, based on the frequency of change in state corresponding to the plurality of DOM elements, the LSTM model may be trained. It should be noted that, a state of each element in plurality of DOM element is very important to understand the element validity and verification. Further, the state is determined based on the change in the plurality of DOM elements. By way of an example, if an element value corresponding to the plurality of DOM elements, changes every time on execution of the application code component in historic data then the element may be referred as dynamic. Similarly, if the element value corresponding to the plurality of DOM elements remains same as in historic data, then element may be referred as static. The static state may be directly consumed based on the element.

At step 304, the set of dynamic DOM elements may be identified from the plurality of DOM elements. The set of dynamic DOM elements may be identified based on the frequency of change in state determined. The frequency of change in state for each element of the set of dynamic DOM elements may be above a first pre-defined threshold. Moreover, execution of the set of dynamic DOM elements may be based on the sequence within the repetitive pattern. At step 306, the path and the path position may be determined within the application code component of the repetitive pattern for each of the set of dynamic DOM elements. With reference to FIG. 2, the path position may correspond to the location. In an embodiment, the path may be determined based on the pointer and the path position may be determined by a tree navigating to that pointer. The pointer may be included in the element and other thread. Based on the pointer a passive path that may locate the respective pointer may be determined. Further, based on the determined passive path the tree navigation may be initiated from that pointer.

By way of an example, suppose the application code component may be in HTML language. The DIV element may be considered as a main component of the application code component. In addition, another component based on the DIV element, may include, but is not limited to, header, sub div or any other component. Moreover, based on the pointer, a first DIV element may be captured. The first DIV element captured along with the datatype may be fed to parsing module 210 to check whether the DOM element corresponding to the first DIV may be detectable or not. If the DOM element may not be detectable then the tree may navigate to next DIV element. A cycle of detecting the DOM element may continue until the DOM element may be detectable from the application code associated to the user interface. Sometimes, after many cycles, the DOM elements may still not be detectable because of Iframe. It should be noted that, the Iframe is another core component of the HTML. As in case of Iframe, while moving to next DIV an Iframe element needs to be detected first. Thereafter, based on the Iframe element the next DIV need to be called out.

As will be appreciated, apart from the HTML being most widely used in web designing, a system-based application may also be easily detected using standard protocols. Moreover, for every action, it may be recommended to define a function as per coding standard. In addition, in the system-based application there may be no DIV but the control of actions may be detected based on the function and the coding standards. Example for the application code component in the HTML is represented below:

```
Find-web-element (by-iframe (by-div (by-class= "XXXX")))
{
Find-web-element (by-div (by-id = "XXXX"))
```

Similarly, for the system-based application, the application code component may look similar, only coding features and associated parameters may change. In addition, the passive path of sequence is generated for each element of the set of dynamic elements. Thereafter, the set of dynamic elements are stored in the data repository 208 for training purpose. The sequence of each element may happen as being detected by action of the end user. Moreover, the sequence of each element may be arranged based on the occurrence of element.

At step 308, an Artificial Intelligence (AI) model may be trained for each of the repetitive pattern. The training of the AI model may be done for each element in the set of dynamic DOM element based on the path and the path position within the application code component. In addition, the sequence corresponding to each element in the set of dynamic DOM elements may be also used training. By way of an example, the LSTM model may be trained based on the sequence, the path and the path position for each element in the set of dynamic DOM elements. Moreover, in order to learn the long chain of the sequence, deep neural network may be used to identify and remember the sequence. Further, the identified sequences may be grouped together to form a new dataset. The new dataset may be fed into a first layer or input layer of neurons of the LSTM model. The neurons may include the input layer with three gates. A first gate may correspond to an update gate. The first gate may receive the new dataset as input that may be further fed into the neurons of the input layer. The first gate may then measure volume based the new dataset received. Thereafter, based on the volume determined, weights and initial neurons may be calculated for the new dataset. Further, a result determined by the input layer may be forwarded to a forget layer of the neurons of the LSTM model.

The forget layer may then determine relevancy of the identified sequence corresponding to the set of dynamic DOM elements. Further, the forget layer may remove all unwanted chunks of data and errors from the result of input layer. The unwanted chunks may need to be removed, in order to ensure the high level of accuracy of the LSTM model. Moreover, post refining the result received from the input layer, by the forget layer, the result may be added to an output layer. The output layer may predict the next set of action based on timestamps of past historic timestamp input. The output layer may act as an encoder and a decoder, where the identified sequence corresponding to the set of dynamic DOM elements may be provided as an input and the next set of actions may be generated as an output. The output may be generated based on the length of the sequence. It should be noted that, other than LSTM model many other models may be used, but the LSTM model provides the best accuracy for the proposed mechanism. Moreover, the LSTM model may transform itself into one-one distribution when a single sequence may be provided as input. Similarly, when more than one sequence is provided as input than the output generated may be same in number as the input sequence. At step 310, a code for each of the set of dynamic DOM elements may be automatically executed based on the associated path and the path position. Moreover, the code for each of the set of dynamic DOM elements may be executed based on conformance of the sequence within the repetitive pattern.

Figure 4:
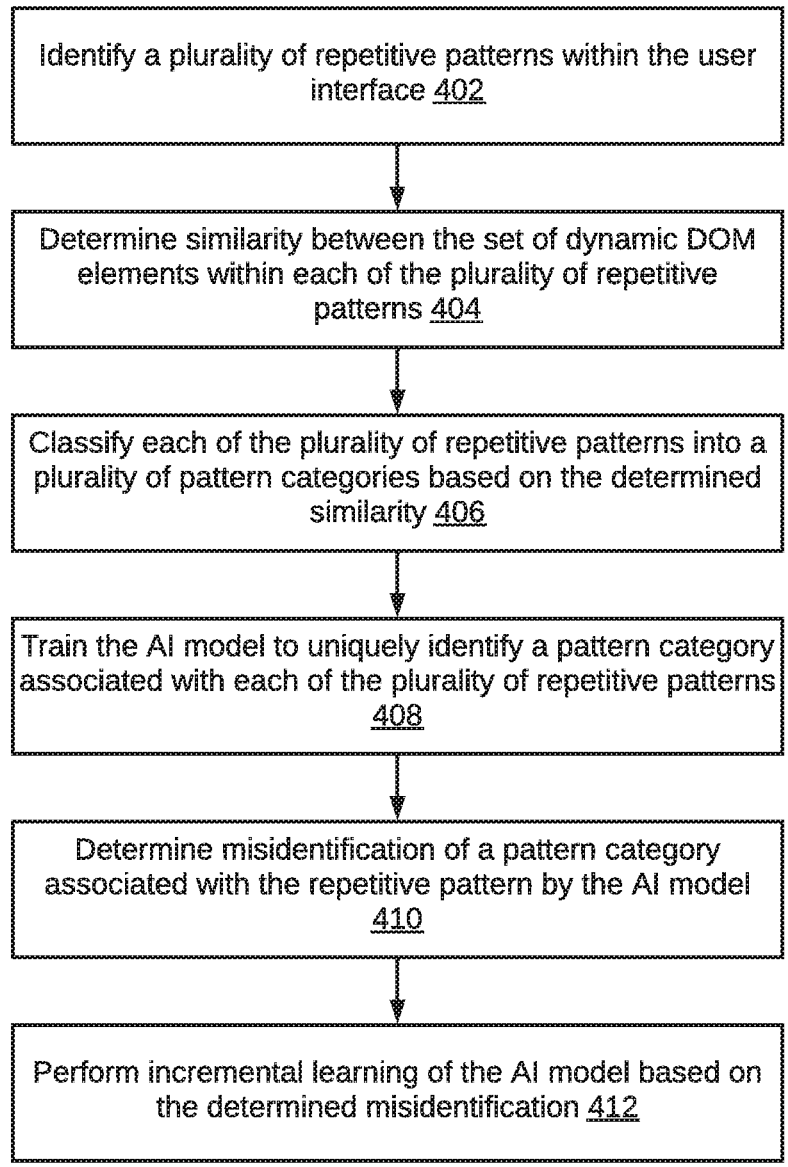
FIG. 4 illustrates a flowchart of a method for performing incremental learning of an Artificial Intelligence (AI) model based on training of the AI model for a plurality of repetitive tasks (also referred as repetitive patterns), in accordance with an embodiment.

Referring now to FIG. 4, a flowchart of a method for performing incremental learning of an AI model based on training of the AI model for a plurality of repetitive tasks (also referred as repetitive patterns) is illustrated, in accordance with an embodiment. At step 402, the plurality of repetitive patterns may be identified within the user interface. The repetitive patterns may be identified when the frequency of repetition for each of the repetitive pattern may be above a second predefined threshold. Moreover, the plurality of repetitive patterns may be identified from a set of data that includes details of an application code associated with the user interface. Once the repetitive patterns are identified then, at step 404, the similarity between the set of dynamic DOM elements may be identified within each of the plurality of repetitive patterns. At step 406, each of the plurality of repetitive patterns may be classified into the plurality of patterns categories based on the determined similarity. The classification may be done by categorizing two or more repetitive patterns in a pattern category from the plurality of pattern categories. The two or more repetitive patterns may be classified in the pattern category, when the similarity between the two or more repetitive patterns is above the similarity threshold. At step 408, the AI model may be trained to uniquely identify the pattern category associated with each of the plurality of repetitive patterns, Once the AI model is trained, at step 410, the misidentification of the pattern category associated with the repetitive pattern may be determined by the AI model. Thereafter, at step 412, incremental learning of the AI model may be performed based on the determined misidentification.

Figure 5:
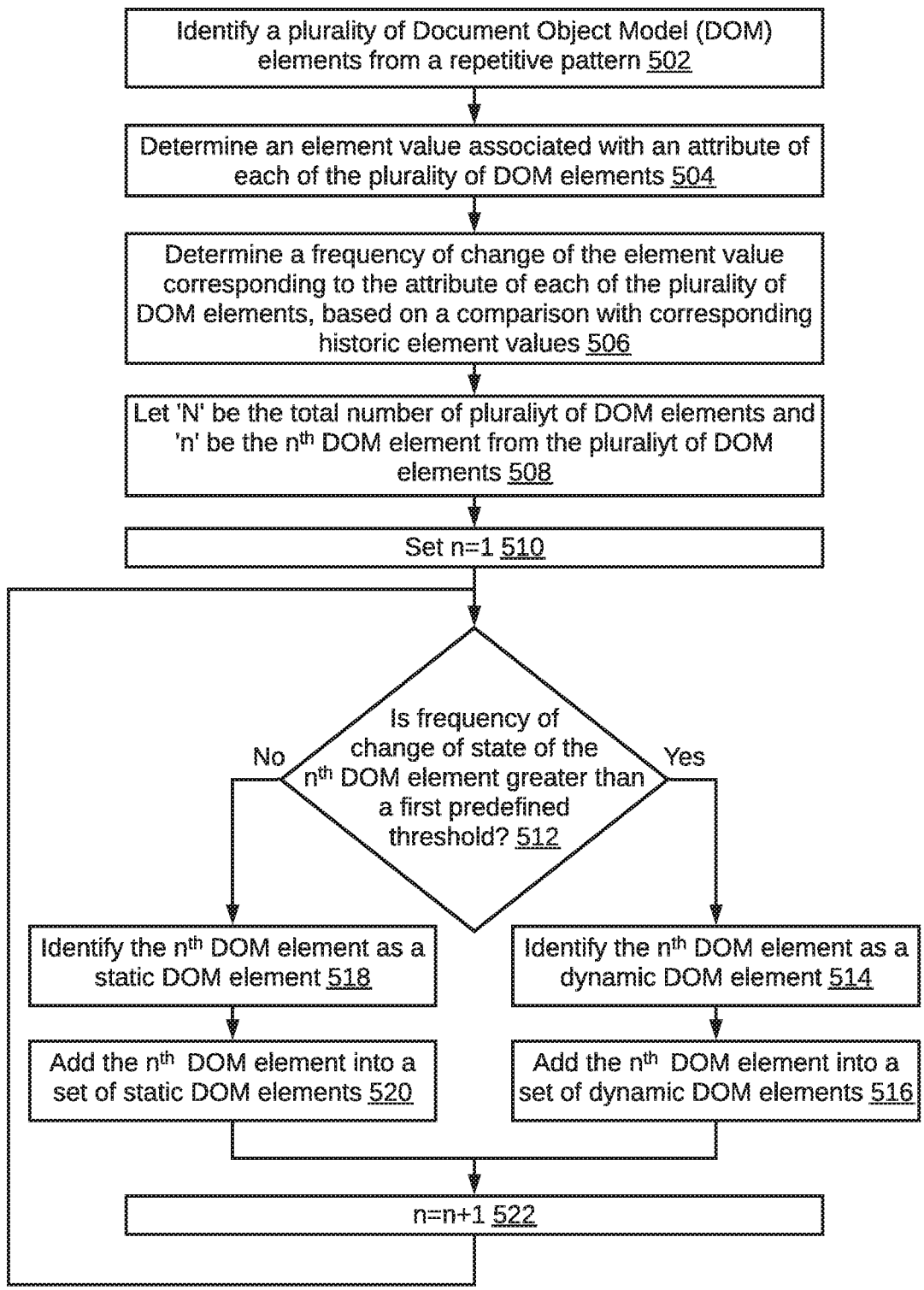
FIG. 5 illustrates a flowchart of a method for determining a set of dynamic Document Object Model (DOM) elements from a plurality of DOM elements, in accordance with an embodiment.

Referring now to FIG. 5, a flowchart of a method for determining a set of dynamic DOM elements from a plurality of DOM elements is illustrated, in accordance with an embodiment. At step 502, the plurality of DOM elements may be identified from the repetitive pattern. At step 504, an element value associated with an attribute may be determined from each of the plurality of DOM elements. On determining the element value and the associated attribute value, at step 506, the frequency of change of the element value corresponding to the attribute may be determined for each of the plurality of DOM elements. The frequency of change of the element value may be determined based on a comparison of each of the element value with corresponding historic element values. The change in an element value associated with an attribute of a DOM element may correspond to change of state of the DOM element. At step 508, we may assume that the total number of plurality of DOM elements may be N. In addition, 'n' may be the '$n^{th}$' DOM element from the plurality of DOM elements. Thereafter, at step 510, the DOM element 'n' may be initialized to one i.e., n=1. It should be noted that, the value initialized to 'n' may keep on increasing once the change of state is determined for n–$1^{th}$ DOM element.

At step 512, the frequency of change of state may be evaluated for the $n^{th}$ DOM element based on the first predefined threshold. In an embodiment, when the frequency of change of state of the $n^{th}$ DOM element is evaluated to be greater than the first predefined threshold, then at step 514, the $n^{th}$ DOM element may be identified as a dynamic DOM element. However, the frequency of change of the element value with the associated attribute value for the $n^{th}$ DOM element may be evaluated based on the first predefined threshold. Moreover, if the frequency of change of the element value of the $n^{th}$ DOM element is determined to be greater than the first predefined threshold, then the $n^{th}$ DOM element may be listed as the dynamic DOM element. At step 516, the identified $n^{th}$ DOM element (listed as the dynamic DOM element) may be added to the set of dynamic DOM elements.

In another embodiment, when the frequency of change of state of the $n^{th}$ DOM element is evaluated to be less than or equal to the first predefined threshold, then at step 518, the $n^{th}$ DOM element may be identified as a static DOM element. However, the frequency of change of the element value with the associated attribute value for the $n^{th}$ DOM element may be evaluated based on the first predefined threshold. Moreover, if the frequency of change of the element value of the $n^{th}$ DOM element is determined to be less than or equal to the first predefined threshold, then the $n^{th}$ DOM element may be listed as the static DOM element. At step 520, the identified $n^{th}$ DOM element (listed as the static DOM element) may be added to the set of static DOM elements. At step 522, the value one initialized to 'n' may be incremented by one represented as 'n=n+1'.

Figure 6:
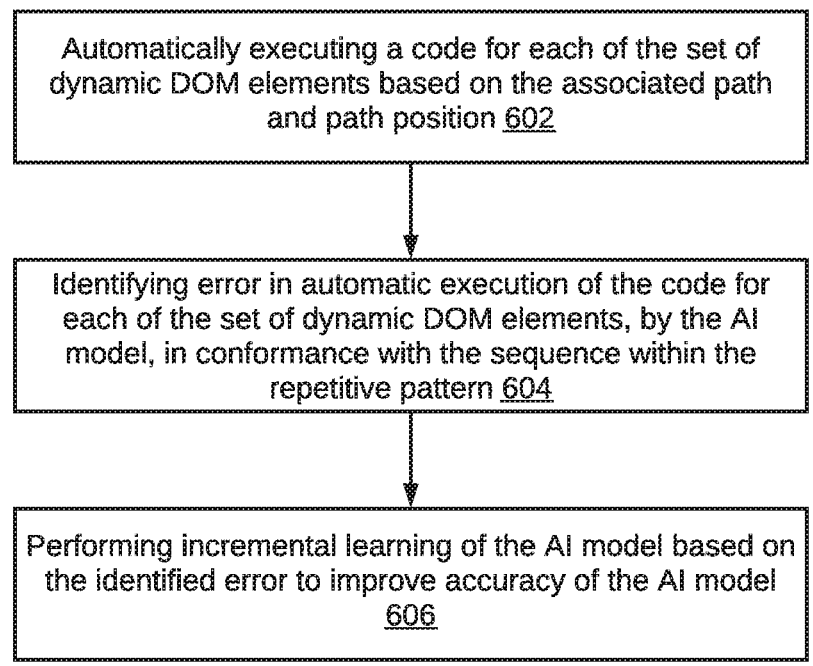
FIG. 6 illustrates a flowchart of a method for improving an accuracy of an AI model based on an error identified, in accordance with an embodiment.

Referring now to FIG. 6, a flowchart of a method for improving an accuracy of an AI model based on an error identified is illustrated, in accordance with an embodiment. At step 602, the code for each of the set of dynamic DOM elements may be automatically executed based on the associated path and the path position. Moreover, the code for each of the set of dynamic DOM elements may be executed based on conformance of the sequence within the repetitive pattern. Once the automatic execution of the code starts, then at step 604, error may be identified in automatic execution of the code for each of the set of dynamic DOM elements. The error may be identified by the AI model in conformance with the sequence within the repetitive pattern. It should be noted that the error may be traced by the error correcting module 216. The error may be captured based on the actual sequence and the predicted sequence for each of the set of dynamic DOM elements. By way of an example, the error may be captured by determining a variance in the actual sequence and the predicted sequence. The variance determined may be a binary number or a probabilistic number based on different coding standards and convention.

It should be noted that, the error tracing may be generally performed based on the back-propagation mechanism or by using similar other mechanism like regression analysis. Moreover, the back-propagation mechanism may be generally considered as in the proposed mechanism, the deep neural network may be used. The back-propagation mechanism may be performed during testing phase of the AI model in order to achieve 100% accuracy of the AI model. Therefore, the variance in the predicted sequence and the actual sequence may be noticed before releasing the AI model to operate in operation.

At step 606, incremental learning for the AI model may be performed based on the error identified, in order to improve the accuracy of the AI model. In addition, the accuracy of the AI model may be improved to execute the code for each of the set of dynamic DOM elements in conformance with the sequence within the repetitive pattern. Moreover, the accuracy may be improved by replacing the error with the variance determined to automatically generate correct output. This may ensure consecutive training of the AI model. Once the error is eliminated, then the AI model may be used for real time application.

An applicability of proposed invention in the present disclosure is explained via an example. Consider a scenario, where the repetitive task (also referred as repetitive pattern) that may need to be automated may correspond to a login process for a particular web page. To automate the login process, the plurality of DOM elements may be traced from a login web page. The plurality of DOM elements for the login web page may be determined by parsing the application code component corresponding to the login process. Further, an element value with an associated attribute value may be determined from the application code component for the login web page. The element value here may correspond to a password and the associated attribute may correspond to an input to username. The password and the username may be predefined by the end user.

Alternatively, the password and the username may be learned by the AI model based on pattern detection. Thereafter, the AI model may fetch a code that may control process of login button. Once the code is determined, a predicted action for automating the process of login may include clicking on the login button. This action may be performed by the classification module 214. Alternatively, the classification module 214 may generate the trigger to the optimized testing interface 220. In other words, the classification module 214 may pass the control to the optimized testing interface 220. This cycle may keep on going.

Figure 7:
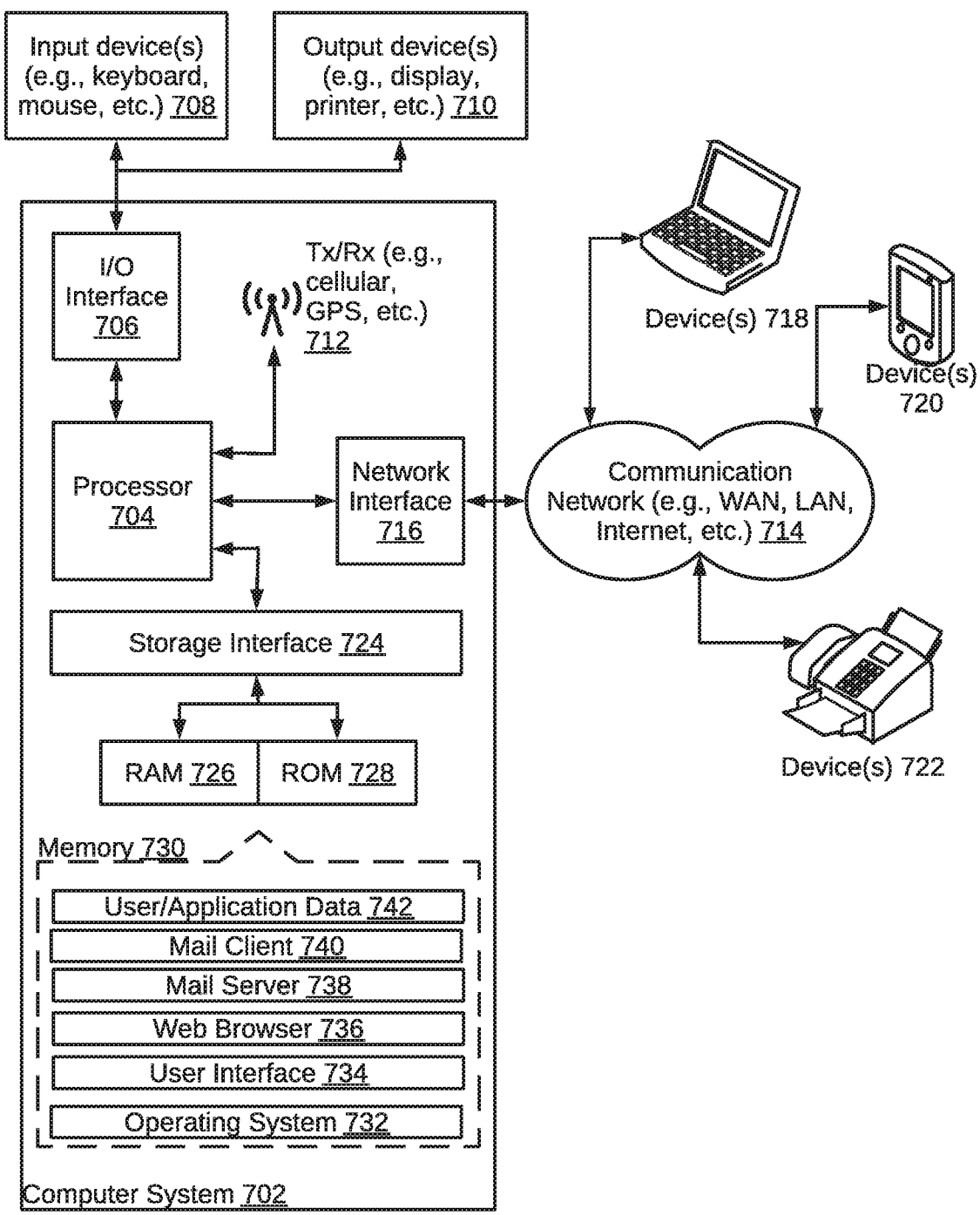
FIG. 7 illustrates a block diagram of an exemplary computer system or implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD ATHLOM® microprocessor, DURON® microprocessor OR OPTERON® microprocessor. ARM's application, embedded or secure processors, IBM® POWERPC®, INTEL'S CORE® processor, ITA- NIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® 10S® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, ©HTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internee message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for automating repetitive task on a user interface. The method and system may first identify a plurality of DOM elements from the repetitive patterns. The plurality of DOM elements may be identified by parsing an application code component of the repetitive pattern. The method and system may then identify a set of dynamic DOM elements from the plurality of DOM elements. Further, the method may identify a path and a path position within the application code component of the repetitive pattern for each of the set of repetitive patterns. Thereafter, the method and system may perform training of an Artificial Intelligence (AI) model to identify the repetitive pattern, and the corresponding path and the path position within the application code component for each of the set of dynamic DOM elements. Additionally, the method and the system may execute a code automatically for each of the set of dynamic DOM elements based on the associated path and path position.

The benefit of the invention is that, the present invention may automate RPA process and tracking of the application code component (also referred as web element code) without human intervention. The present invention may also reduce manual efforts and time taken to develop an RPA bot. Moreover, the present invention may support auto code generation technique, thereby eliminating the need to fetch and develop the RPA bots. Additionally, the present invention explores and develop multiple assistance model that may be applicable for system-based application as well as part from web applications. Moreover, the present invention supports timely proportional changes corresponding to the change in web-element (i.e., the DOM element) of the user interface. Furthermore, the present invention disclosed may reduce manual efforts of the end user for performing the repetitive tasks on daily basis.

The specification has described method and system for automating a repetitive task on a user interface. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium ay store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating repetitive task on a user interface, the method comprising:
   identifying, by a Robotic Process Automation (RPA) device, a plurality of Document Object Model (DOM) elements from a repetitive pattern, wherein the plurality of DOM elements are identified based on parsing of an application code component of the repetitive pattern;
   identifying, by the RPA device, a set of dynamic DOM elements from the plurality of DOM elements, wherein frequency of change of state of each of the set of dynamic DOM elements is above a first predefined threshold, and wherein execution of the set of dynamic DOM elements is based on a sequence within the repetitive pattern;
   determining, by the RPA device, a path and a path position within the application code component of the repetitive pattern for each of the set of dynamic DOM elements;

training, by the RPA device, an Artificial Intelligence (AI) model to:
  identify the repetitive pattern; and
  identify, for each of the set of dynamic DOM elements, the corresponding path and the path position within the application code component; and
automatically executing, by the RPA device using the AI model, a code for each of the set of dynamic DOM elements based on the associated path and path position, wherein the code for each of the set of dynamic DOM elements are executed in conformance with the sequence within the repetitive pattern.

2. The method of claim 1, further comprising identifying a plurality of repetitive patterns within the user interface, wherein frequency of repetition for each of the plurality of repetitive patterns is above a second predefined threshold.

3. The method of claim 2, wherein the plurality of repetitive patterns are identified from a set of data comprising details of an application code associated with the user interface.

4. The method of claim 2, further comprising:
  determining similarity between the set of dynamic DOM elements within each of the plurality of repetitive patterns; and
  classifying each of the plurality of repetitive patterns into a plurality of pattern categories based on the determined similarity, wherein two or more repetitive patterns from the plurality of repetitive patterns are classified in a pattern category from the plurality of pattern categories, when similarity between the two or more repetitive patterns is above a similarity threshold.

5. The method of claim 4, further comprising training the AI model to uniquely identify a pattern category associated with each of the plurality of repetitive patterns.

6. The method of claim 5, further comprising:
  determining misidentification of a pattern category associated with the repetitive pattern by the AI model; and
  performing incremental learning of the AI model based on the determined misidentification.

7. The method of claim 1, wherein identifying the set of dynamic DOM elements from the plurality of DOM elements comprises:
  determining an element value associated with an attribute of each of the plurality of DOM elements;
  determining a frequency of change of the element value corresponding to the attribute of each of the plurality of DOM elements, based on a comparison with corresponding historic element values, wherein change of an element value associated with an attribute of a DOM element corresponds to change of state of the DOM element; and
  establishing each of the set of dynamic DOM elements as dynamic, wherein the frequency of change of the element value corresponding to the attribute of each of the set of dynamic DOM elements is above the first predefined threshold.

8. The method of claim 1, further comprising identifying a set of static DOM elements from the plurality of DOM elements, wherein frequency of change of state of each of the set of static DOM elements is equal to or less than the first predefined threshold.

9. The method of claim 1, further comprises identifying error in automatic execution of the code for each of the set of dynamic DOM elements, by the AI model, in conformance with the sequence within the repetitive pattern.

10. The method of claim 9, further comprising performing incremental learning of the AI model based on the identified error to improve accuracy of the AI model, wherein accuracy of the AI model is improved to execute the code for each of the set of dynamic DOM elements in conformance with the sequence within the repetitive pattern.

11. A system for automating repetitive task on a user interface, the system comprising:
  a processor; and
  a memory communicatively coupled to the processor, wherein the memory stores processor instructions, which, on execution, causes the processor to:
    identify a plurality of Document Object Model (DOM) elements from a repetitive pattern, wherein the plurality of DOM elements are identified based on parsing of an application code component of the repetitive pattern;
    identify a set of dynamic DOM elements from the plurality of DOM elements, wherein frequency of change of state of each of the set of dynamic DOM elements is above a first predefined threshold, and wherein execution of the set of dynamic DOM elements is based on a sequence within the repetitive pattern;
    determine a path and a path position within the application code component of the repetitive pattern for each of the set of dynamic DOM elements;
    train an Artificial Intelligence (AI) model to:
      identify the repetitive pattern; and
      identify, for each of the set of dynamic DOM elements, the corresponding path and the path position within the application code component; and
    automatically execute a code for each of the set of dynamic DOM elements based on the associated path and path position, wherein the code for each of the set of dynamic DOM elements are executed in conformance with the sequence within the repetitive pattern.

12. The system of claim 11, wherein the processor instructions further cause the processor to identify a plurality of repetitive patterns within the user interface, wherein frequency of repetition for each of the plurality of repetitive patterns is above a second predefined threshold.

13. The system of claim 12, wherein the plurality of repetitive patterns are identified from a set of data comprising details of an application code associated with the user interface.

14. The system of claim 12, wherein the processor instructions further cause the processor to:
  determine similarity between the set of dynamic DOM elements within each of the plurality of repetitive patterns; and
  classify each of the plurality of repetitive patterns into a plurality of pattern categories based on the determined similarity, wherein two or more repetitive patterns from the plurality of repetitive patterns are classified in a pattern category from the plurality of pattern categories, when similarity between the two or more repetitive patterns is above a similarity threshold.

15. The system of claim 14, wherein the processor instructions further cause the processor to train the AI model to uniquely identify a pattern category associated with each of the plurality of repetitive patterns.

16. The system of claim 15, wherein the processor instructions further cause the processor to:
  determine misidentification of a pattern category associated with the repetitive pattern by the AI model; and
  perform incremental learning of the AI model based on the determined misidentification.

17. The system of claim 11, wherein the processor instructions further cause the processor to:
   determine an element value associated with an attribute of each of the plurality of DOM elements;
   determine a frequency of change of the element value corresponding to the attribute of each of the plurality of DOM elements, based on a comparison with corresponding historic element values, wherein change of an element value associated with an attribute of a DOM element corresponds to change of state of the DOM element; and
   establish each of the set of dynamic DOM elements as dynamic, wherein the frequency of change of the element value corresponding to the attribute of each of the set of dynamic DOM elements is above the first predefined threshold.

18. The system of claim 11, wherein the processor instructions further cause the processor to identify a set of static DOM elements from the plurality of DOM elements, wherein frequency of change of state of each of the set of static DOM elements is equal to or less than the first predefined threshold.

19. The system of claim 11, the processor instructions further cause the processor to identify error in automatic execution of the code for each of the set of dynamic DOM elements, by the AI model, in conformance with the sequence within the repetitive pattern.

20. The system of claim 19, the processor instructions further cause the processor to perform incremental learning of the AI model based on the identified error to improve accuracy of the AI model, wherein accuracy of the AI model is improved to execute the code for each of the set of dynamic DOM elements in conformance with the sequence within the repetitive pattern.

21. A non-transitory computer-readable storage medium for automating repetitive task on a user interface, having stored thereon, a set of computer-executable instructions causing a computer comprising one or more processors to perform steps comprising:
   identify a plurality of Document Object Model (DOM) elements from a repetitive pattern, wherein the plurality of DOM elements are identified based on parsing of an application code component of the repetitive pattern;
   identify a set of dynamic DOM elements from the plurality of DOM elements, wherein frequency of change of state of each of the set of dynamic DOM elements is above a first predefined threshold, and wherein execution of the set of dynamic DOM elements is based on a sequence within the repetitive pattern;
   determine a path and a path position within the application code component of the repetitive pattern for each of the set of dynamic DOM elements;
   train an Artificial Intelligence (AI) model to:
      identify the repetitive pattern; and
      identify, for each of the set of dynamic DOM elements, the corresponding path and the path position within the application code component; and
   automatically execute a code for each of the set of dynamic DOM elements based on the associated path and path position, wherein the code for each of the set of dynamic DOM elements are executed in conformance with the sequence within the repetitive pattern.

* * * * *